(12) United States Patent
Evans et al.

(10) Patent No.: US 8,260,094 B2
(45) Date of Patent: Sep. 4, 2012

(54) PHOTONIC INTEGRATED CIRCUIT EMPLOYING OPTICAL DEVICES ON DIFFERENT CRYSTAL DIRECTIONS

(75) Inventors: Peter W. Evans, Mountain House, CA (US); Scott Corzine, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 431 days.

(21) Appl. No.: 12/344,105

(22) Filed: Dec. 24, 2008

(65) Prior Publication Data
US 2009/0220191 A1    Sep. 3, 2009

Related U.S. Application Data

(60) Provisional application No. 61/030,774, filed on Feb. 22, 2008.

(51) Int. Cl.
*G02B 6/12* (2006.01)
*G02B 6/00* (2006.01)

(52) U.S. Cl. .......................................... 385/14; 385/147
(58) Field of Classification Search ................. 385/14, 385/15, 16, 24, 27, 39, 41, 129, 131, 147; 359/133
See application file for complete search history.

(56) References Cited

U.S. PATENT DOCUMENTS

| | | | | |
|---|---|---|---|---|
| 4,099,836 A * | 7/1978 | Baues et al. | ................... | 385/141 |
| 4,114,257 A * | 9/1978 | Bellavance | ...................... | 438/24 |
| 5,073,003 A * | 12/1991 | Clark | ............................... | 385/33 |
| 7,076,126 B2 * | 7/2006 | Joyner et al. | ..................... | 385/14 |
| 7,092,609 B2 * | 8/2006 | Yegnanarayanan et al. | .. | 385/131 |
| 2003/0016415 A1 * | 1/2003 | Jun et al. | ........................ | 359/133 |
| 2003/0022456 A1 * | 1/2003 | Callaway, Jr. | ................. | 438/385 |

* cited by examiner

*Primary Examiner* — Akm Ullah
(74) *Attorney, Agent, or Firm* — David L. Soltz

(57) ABSTRACT

Consistent with the present disclosure, various optical components are preferably arranged on the surface of a semiconductor substrate such that light propagates in certain components at a direction that is perpendicular to a direction of propagation in other components in order to improve performance and component density.

31 Claims, 4 Drawing Sheets

PHOTONIC INTEGRATED CIRCUIT EMPLOYING OPTICAL DEVICES ON DIFFERENT CRYSTAL DIRECTIONS

This application claims the benefit under 35 U.S.C. §119 (e) of U.S. Provisional Patent Application No. 61/030,774, filed Feb. 22, 2008, the contents of which are incorporated herein by reference.

DESCRIPTION OF THE INVENTION

Background of the Invention

Optical communication systems often include optical components such as lasers, which generate light to be carried on a fiber in the system, and modulators, which modulate the light in accordance with information to be transmitted in the system. Conventionally, lasers and modulators have been housed in separate packages. More recently, however, efforts have been made to integrate these components on a common substrate.

Such components may have different electrical characteristics, as well different preferred geometries, e.g., some components require relatively straight sidewalls, while others may tolerate tilted sidewalls. Moreover, some components may have different thermal characteristics, and, therefore, may require different levels of thermal isolation.

Accordingly, there is a need to integrate diverse optical components so that each can operate in an optimal fashion.

SUMMARY OF THE INVENTION

Consistent with the present disclosure, an optical circuit is provided that includes a monocrystalline layer, which has a surface. A first optical device, which may be active, is provided on the surface of the substrate and is oriented such that light propagates in the active optical device along a first direction in the surface of the substrate. A second optical device is also provided on the substrate, such that the first optical device supplies the light to the second optical device. The first optical device is oriented such that the light propagates in the second optical device along a second direction in the crystallographic plane, such that the first and second directions define an angle which is other than 0 degrees, 180 degrees, and integer multiples of 180 degrees. The second optical device may be passive.

Consistent with a further aspect of the present disclosure, an optical circuit is provided that includes an InP substrate. A first optical device is provided on the substrate and is oriented such that light propagates in the first optical device along a first direction in the crystallographic plane. The first direction is perpendicular to the (0$\bar{1}$ 1) plane, and may be, for example, the <011> direction. The first optical device supplies the light to a second optical device provided on the substrate. The second optical device is oriented such that the light propagates in the second optical device along a second direction in the crystallographic plane. The second direction is substantially perpendicular to the (0$\bar{1}$ 1) direction, and may be, for example, the <01$\bar{1}$> direction.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure and together with the description, serve to explain the principles of the invention.

DESCRIPTION OF THE EMBODIMENTS

Consistent with the present disclosure, various optical components are preferably arranged on the surface of a semiconductor substrate such that light propagates in certain components at a direction that is perpendicular to a direction of propagation in other components. For example, a distributed feedback (DFB) laser is preferably provided on an indium phosphide (InP) substrate such that light propagates in the laser along a first direction which is substantially perpendicular to a (0$\bar{1}$ $\bar{1}$) crystallographic plane, such as the <011> direction. In addition, a Mach-Zehnder (MZ) modulator may be provided on the InP substrate to modulate light output from the laser. The Mach-Zehnder modulator may be oriented such that light propagates in a second direction substantially perpendicular to a (0$\bar{1}$ 1) crystallographic plane, such as the <01$\bar{1}$> direction. As a result, both devices are arranged along preferred orientations or crystallographic directions in order to obtain optimal performance due to the birefringent nature of the zinc blende crystal lattice of InP. Although the first and second directions are described as being perpendicular to each other, it is understood that other angles are considered within the scope of this disclosure. For example, the first and second directions may define any angle other than 0 degrees, 180 degrees, and integer multiples of 180 degrees.

Reference will now be made in detail to the following exemplary embodiments, which are illustrated in the accompanying drawings. Wherever possible, the same reference numbers will be used throughout the drawings to refer to the same or like parts.

Figure 1:
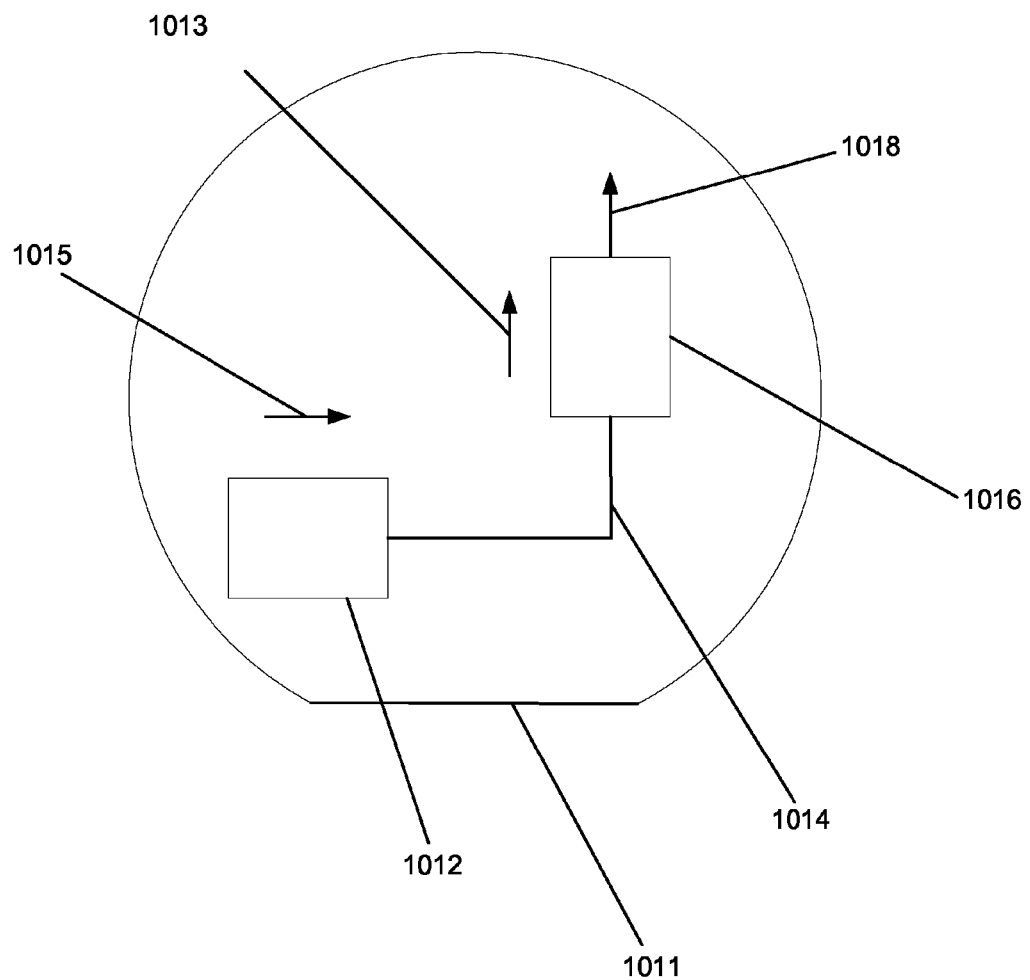
FIG. 1 is a plan view of a photonic integrated circuit consistent with an aspect of the present disclosure.

FIG. 1 illustrates a monocrystalline layer, which may include a semiconductor wafer 1011 or substrate, as well as an epitaxial layer provided on a substrate. The monocrystalline layer may include indium phosphide (InP) or gallium arsenide (GaAs), for example, and may have (0$\bar{1}$ $\bar{1}$) and a (0$\bar{1}$ 1) crystallographic planes. A distributed feedback (DFB) laser 1012 may be formed on a surface of semiconductor wafer 1011 and is coupled to a waveguide 1014. Waveguide 1014 supplies an optical output from DFB laser 1012 to a modulator, such as MZ modulator 1016. DFB laser 1012 is typically operated in a continuous wave (CW) mode and MZ modulator 1016 is configured to modulate the light output by the laser in accordance with data to be transmitted to a receiving node (not shown). MZ modulator 1016 outputs modulated light 1018.

As noted above, the crystallographic orientations associated with the material constituting DFB laser 1012 and MZ modulator 1016 are different and the directions associated with these orientations may be orthogonal to one another.

Figure 2:
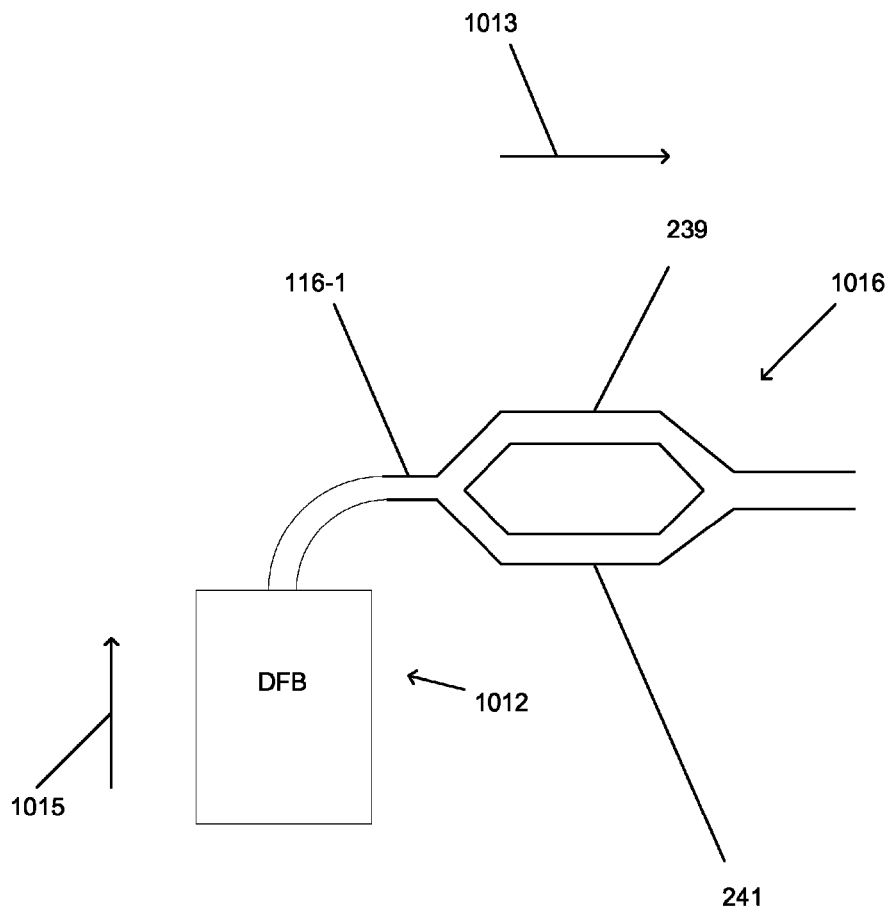
FIG. 2 is a plan view of a mask layer consistent with an aspect of the present disclosure.

FIG. 2 shows optical waveguides for a DFB laser 1012 and a MZ modulator 1016. The MZ modulator 1016 is oriented so that parallel arms 239 and 241 are oriented in a direction aligned with or parallel to a first crystallographic axis of wafer 1011, such that the direction is substantially perpendicular to the (0$\bar{1}$ 1) crystallographic plane. The direction may be the <01$\bar{1}$> direction (as indicated by arrow 1013 in FIGS. 1 and 2), for example. Such an orientation is desired in order to obtain improved performance of the MZ modulator 1016.

In addition, DFB laser 1012 is oriented so that light propagates in another direction aligned with or parallel to a second crystallographic axis of wafer 1011, which is substantially perpendicular to the (0$\bar{1}$ $\bar{1}$) crystallographic plane. This further direction may be the <011> direction (as indicated by arrow 1015 in FIGS. 1 and 2), for example. This orientation is preferred, as noted above, in order to realize improved manufacturability of DFB laser 1012. Note that, for ease of illustration, arrows 1013 and 1015 have been rotated by 90 degrees in FIG. 2 relative to FIG. 1. As generally understood, light output from DFB laser 1012 is split by portion 116-1 of MZ modulator 116 and supplied to arms 239 and 241.

Figure 4:
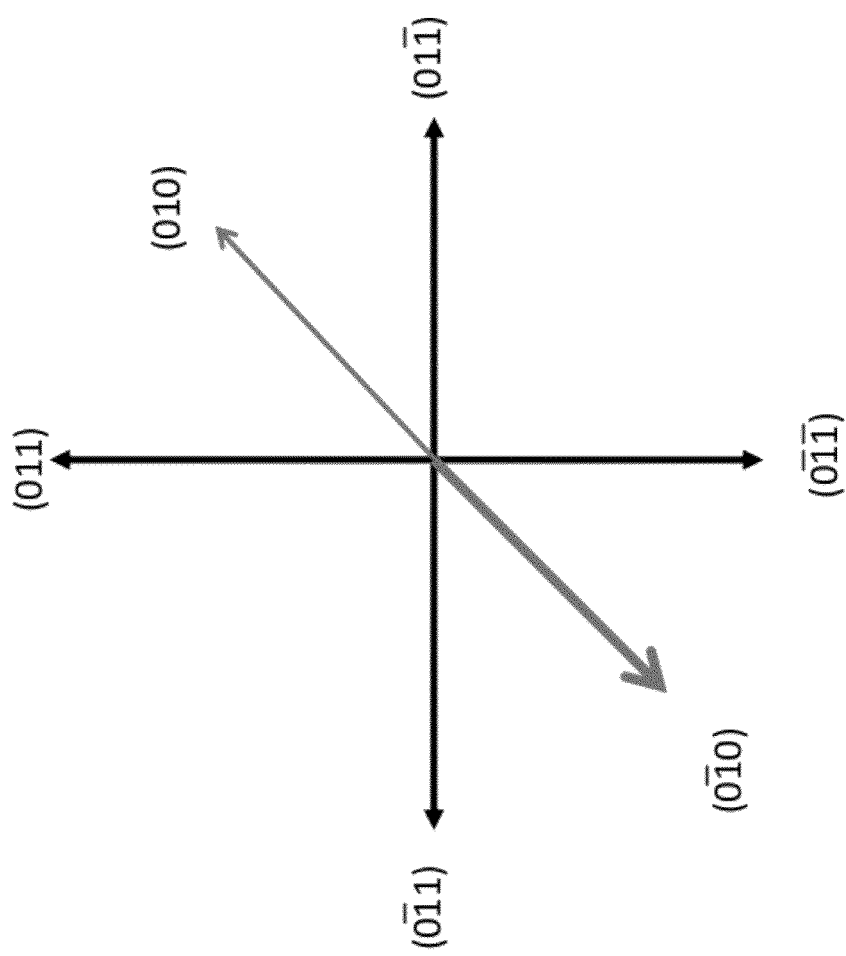
FIG. 4 illustrates various crystallographic orientations.

It is understood that, in connection with the description herein, that crystal directions (axes) may be initially assigned arbitrarily and subsequently described in several redundant notations as shown FIG. 4. Accordingly, as used herein, "(0$\bar{1}$ $\bar{1}$) crystallographic plane" means the (0$\bar{1}$ $\bar{1}$) crystallographic plane, as well as other equivalent planes, such as the (011) plane. Likewise, as used herein, "(0$\bar{1}$ 1) crystallographic plane" means the (0$\bar{1}$ 1) crystallographic plane, as well as other equivalent planes, such as the (01 $\bar{1}$) crystallographic plane. The same holds true for crystallographic directions as well.

Figure 3:
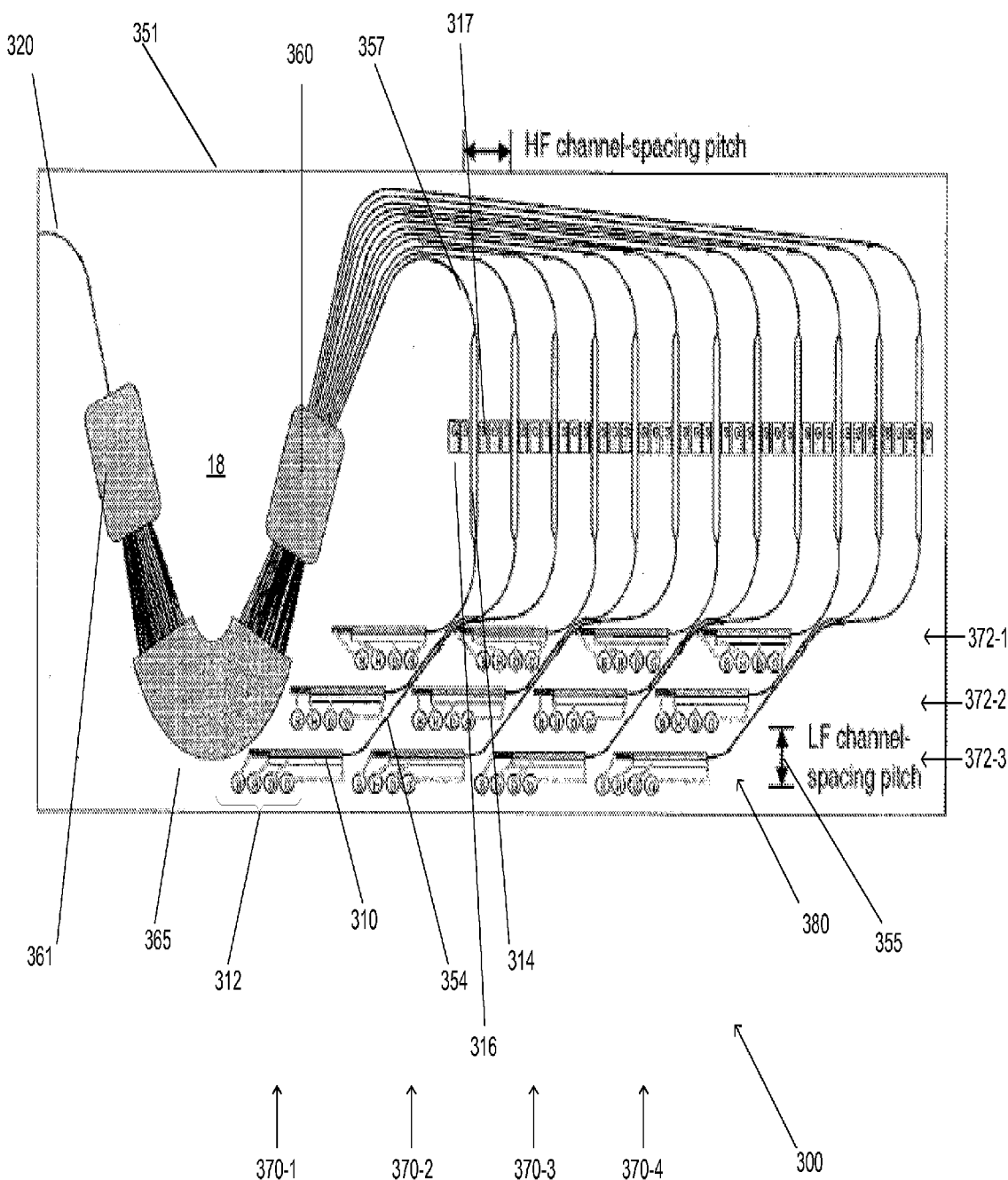
FIG. 3 is a detailed plan view of an example of a photonic integrated circuit consistent with the present disclosure.

FIG. 3 illustrates an example of a photonic integrated circuit (PIC) 300 consistent with an aspect of the present disclosure. PIC 300 is provided on monocrystalline layer or substrate 351, which preferably includes InP. A plurality of active devices, such as lasers 310, typically DFB lasers, provided on substrate 351. Each of lasers 310 is electrically connected to a series of bonding pads 312 which supply voltages to the laser. These voltages are typically applied with a relatively low frequency and vary relatively slowly or are substantially fixed.

Each laser 310 supplies continuous wave (CW) light at a corresponding one of a plurality of wavelengths to a corresponding one of a plurality of passive devices or modulators 314 via waveguides 354. Modulators 314 are typically MZ modulators, each of which being associated with corresponding electrodes pads 316 and 317, which supply voltages representative of the data to be carried by each optical signal. These voltages are thus at a relatively high frequency which is greater than the frequency of the voltages supplied to bonding pads 312. As used herein, active devices pass an electrical current, while, in passive devices, no or substantially little electrical current passes therethrough.

As further shown in FIG. 3 modulated optical signals supplied from each of modulators 314 are fed by waveguides 357 to an optical combiner, which, in this example, is an arrayed waveguide grating (AWG) 18. As generally understood, AWG 18 includes first (360) and second (361) dielectric slabs or free space regions that are connected to one another by waveguides 365. AWG 18 is configured to receive the optical signals supplied by inputs or waveguides 357 and combine them on an output, such as waveguide 320, to thereby supply a wavelength division multiplexed (WDM) optical signal.

Lasers 310 are preferably provided such that light propagates in these devices along a direction substantially perpendicular to the (0$\bar{1}$ $\bar{1}$) crystallographic plane, such as the <011> direction, in order to obtain improved performance of the lasers. It is also contemplated that other devices, such as photodetectors be similarly oriented in a similar fashion as lasers 354 in order to obtain square sidewalls for these devices as well. Tilted sidewalls are often impractical for active devices (such as photodetectors, and lasers).

Modulators 314 are preferably provided such that light propagates in the waveguides that constitute arms of these devices along a direction substantially perpendicular to the (0$\bar{1}$ 1) crystallographic plane, such as the <01$\bar{1}$>.direction. As noted above, waveguide arms (passive devices) so oriented have improved performance. As a result, modulators 314, as well as variable optical attenuators (not shown), may be made smaller than similar devices formed along different crystallographic directions. In particular, these devices may be made half as long as other devices that are not oriented along a direction substantially perpendicular to the (0$\bar{1}$ 1) crystallographic plane. Accordingly, performance can be improved and PIC size can be reduced.

As further shown in FIG. 3, those devices receiving low frequency voltages, such as lasers 310 are separated from one another by a first pitch 355, while devices that receive high frequency voltages, such as modulators 314 are separated from one another by a second pitch, which is greater than the first pitch. Such an arrangement occupies less space on the surface of substrate 351. Other parameters that may be considered in determining the pitch between the devices integrated in PIC 300 includes: thermal crosstalk between the devices, radio frequency (RF) crosstalk between devices, wirebond spacing or bondpad size, electrical interconnect routing, optical interconnect routing, electrical isolation, and device size. In the example shown in FIG. 3, low frequency components, such as lasers 310, are arranged in a staggered or nested fashion manner to facilitate increased device density or packing while still providing adequate connections to the high frequency element, such as modulators 314. In particular, as shown in FIG. 3, lasers 310 are arranged in an array 380 including columns 370-1 to 370-4, as well as rows 372-1 to 372-3, and adjacent lasers 310 within each column are staggered relative to one another.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical circuit, comprising:
   a monocrystalline layer having a surface;
   a first optical device provided on the surface of the monocrystalline layer, the first optical device being oriented such that light propagates in the first optical device along a first direction in the surface of the monocrystalline layer, the first optical device being an active optical device;
   a second optical device provided on the surface of the monocrystalline layer, the first optical device supplying the light to the second optical device, the second optical device being oriented such that the light propagates in the second optical device along a second direction in the surface of the monocrystalline layer, the first and second directions defining an angle other than 0 degrees, 180 degrees, and integer multiples of 180 degrees; and an electrode associated with the second optical device, wherein a first voltage signal is supplied to the electrode and a second voltage signal is supplied to the first optical device, the first voltage signal having a first frequency and the second voltage signal having a second frequency that is greater than the first frequency, wherein the first optical device is one of a plurality of first optical devices provided on the monocrystalline layer and the second optical device is one of a plurality of second optical devices provided on the monocrystalline layer, each of the plurality of first optical devices being separated from one another by a first pitch and each of the plurality of second optical devices being separated from one another by a second pitch, the first pitch being greater than the second pitch.

2. An optical circuit in accordance with claim 1, wherein the angle is substantially equal to 90 degrees.

3. An optical circuit in accordance with claim 1, wherein the monocrystalline layer includes indium phosphide.

4. An optical circuit in accordance with claim 3, wherein the monocrystalline layer has a (100) crystallographic plane, the first and second directions being in the (100) crystallographic plane.

5. An optical circuit in accordance with claim 3, wherein the first optical device is a laser and the second optical device is a Mach-Zehnder interferometer.

6. An optical circuit in accordance with claim 5, wherein the monocrystalline layer has $(0\ \bar{1}\ \bar{1})$ and $(0\ \bar{1}\ 1)$ crystallographic planes, the first direction is substantially perpendicular to the $(0\ \bar{1}\ \bar{1})$ plane and the second direction is substantially perpendicular to the $(0\bar{1}\ 1)$ crystallographic plane.

7. An optical circuit in accordance with claim 1, further including a Mach-Zehnder interferometer, wherein the first optical device includes a laser and the second optical device includes a waveguide, which constitutes a portion of the Mach-Zehnder interferometer.

8. An optical circuit,
a monocrystalline layer having a surface;
a first optical device provided on the surface of the monocrystalline layer, the first optical device being oriented such that light propagates in the first optical device along a first direction in the surface of the monocrystalline layer, the first optical device being an active optical device; and
a second optical device provided on the surface of the monocrystalline layer, the first optical device supplying the light to the second optical device, the second optical device being oriented such that the light propagates in the second optical device along a second direction in the surface of the monocrystalline layer, the first and second directions defining an angle other than 0 degrees, 180 degrees, and integer multiples of 180 degrees,
wherein the first optical device is one of a plurality of first optical devices provided on the substrate, the second optical device is one of a plurality of second optical devices provided on the substrate, and the light constitutes an optical signal, the optical signal is one of a plurality of optical signals, each of which having a corresponding one of a plurality of wavelengths, each of the plurality of second optical devices supplying a corresponding one of the plurality of optical signals, the optical device further including:
an optical combiner, the optical combiner being configured to receive the plurality of optical signals from the plurality of second optical devices, the optical combiner having an output, the plurality optical signals being combined and supplied at the output of the optical combiner as a wavelength division multiplexed signal.

9. An optical circuit, comprising:
a semiconductor layer including InP, the semiconductor layer having $(0\ \bar{1}\ \bar{1})$ and $(0\ \bar{1}\ 1)$ crystallographic planes;
a first optical device provided on the semiconductor layer, the first optical device being oriented such that light propagates in the first optical device along a first direction, the first direction being substantially perpendicular to the $(0\ \bar{1}\ \bar{1})$ crystallographic plane; and
a second optical device provided on the semiconductor layer, the first optical device supplying the light to the second optical device, the second optical device being oriented such that the light propagates in the second optical device along a second direction, the second direction being substantially perpendicular to the $(0\bar{1}\ 1)$ crystallographic plane,
wherein the first optical device is one of a plurality of first optical devices provided on the semiconductor layer and the second optical device is one of a plurality of second optical devices provided on the semiconductor layer, each of the plurality of first optical devices being separated from one another by a first pitch and each of the plurality of second optical devices being separated from one another by a second pitch, the first pitch being less than the second pitch.

10. An optical circuit in accordance with claim 9, wherein the first optical device includes a laser and the second optical device includes a Mach-Zehnder interferometer.

11. An optical circuit,
a semiconductor layer including InP, the semiconductor layer having $(0\ \bar{1}\ \bar{1})$ and $(0\ \bar{1}\ 1)$ crystallographic planes;
a first optical device provided on the semiconductor layer, the first optical device being oriented such that light propagates in the first optical device along a first direction, the first direction being substantially perpendicular to the $(0\ \bar{1}\ \bar{1})$ crystallographic plane;
a second optical device provided on the semiconductor layer, the first optical device supplying the light to the second optical device, the second optical device being oriented such that the light propagates in the second optical device along a second direction, the second direction being substantially perpendicular to the $(0\bar{1}\ 1)$ crystallographic plane,
wherein the first optical device is one of a plurality of first optical devices provided on the semiconductor layer, the second optical device is one of a plurality of second optical devices provided on the semiconductor layer, the light constitutes an optical signal, and the optical signal is one of a plurality of optical signals, each of which having a corresponding one of a plurality of wavelengths, each of the plurality of second optical devices supplying a corresponding one of the plurality of optical signals, the optical device further including:
an optical combiner, the optical combiner being configured to receive the plurality of optical signals from the plurality of second optical devices, the optical combiner having an output, the plurality optical signals being combined and supplied at the output of the optical combiner as a wavelength division multiplexed signal.

12. An optical circuit in accordance with claim 8, wherein the optical combiner includes an arrayed waveguide grating.

13. An optical circuit in accordance with claim 11, wherein the optical combiner includes an arrayed waveguide grating.

14. A photonic integrated circuit, comprising:
a semiconductor layer;

a plurality of lasers provided on the semiconductor layer and arranged in an array including a plurality of columns and a plurality of rows;

a plurality of waveguides provided on the semiconductor layer, each of the plurality of waveguides being coupled to a corresponding one of the plurality of lasers, wherein adjacent ones of the plurality of lasers are staggered relative to one another, and a plurality modulators, each of which being optically coupled to a corresponding one of the plurality of waveguides, and the semiconductor layer has $(0\bar{1}\bar{1})$ and $(0\bar{1}1)$ crystallographic planes, wherein light propagates in one of the plurality of lasers in a first direction, which is substantially perpendicular to the $(0\bar{1}\bar{1})$ plane, and the light propagates in one of the modulators in a second direction, which is substantially perpendicular to the $(0\bar{1}1)$ crystallographic plane, wherein adjacent ones of the plurality of lasers are separated from one another by a first pitch and adjacent ones of the plurality of modulators are separated from one another by a second pitch, which is greater than the first pitch.

15. A photonic integrated circuit in accordance with claim 14, wherein the semiconductor layer includes indium phosphide.

16. A photonic integrated circuit in accordance with claim 14, wherein each of the plurality of lasers is a distributed feedback (DFB) laser and each of the plurality of modulators is a Mach-Zehnder modulator.

17. An optical circuit in accordance with claim 1, wherein the first direction is in a <011> direction and the second direction is in a <01$\bar{1}$> direction.

18. An optical circuit in accordance with claim 9, wherein the first direction is in a <011> direction and the second direction is in a <01$\bar{1}$> direction.

19. An optical circuit in accordance with claim 17, wherein the first direction is in a <011> direction and the second direction is in a <01$\bar{1}$> direction.

20. An optical circuit in accordance with claim 1, further including a waveguide that supplies the light to the second optical device.

21. An optical circuit in accordance with claim 9, further including a waveguide that supplies the light to the second optical device.

22. An optical circuit in accordance with claim 1, wherein the second optical device is a passive optical device.

23. An optical circuit in accordance with claim 1, wherein the first and second directions extend substantially parallel to first and second crystallographic axes, respectively, of the monocrystalline layer.

24. An optical circuit in accordance with claim 8, wherein the angle is substantially equal to 90 degrees.

25. An optical circuit in accordance with claim 8, wherein the monocrystalline layer includes indium phosphide.

26. An optical circuit in accordance with claim 25, wherein the monocrystalline layer has a (100) crystallographic plane, the first and second directions being in the (100) crystallographic plane.

27. An optical circuit in accordance with claim 25, wherein the first optical device is a laser and the second optical device is a Mach-Zehnder interferometer.

28. An optical circuit in accordance with claim 27, wherein the monocrystalline layer has $(0\bar{1}\bar{1})$ and $(0\bar{1}1)$ crystallographic planes, the first direction is substantially perpendicular to the $(0\bar{1}\bar{1})$ plane and the second direction is substantially perpendicular to the $(0\bar{1}1)$ crystallographic plane.

29. An optical circuit in accordance with claim 8, wherein the first direction is in a <011> direction and the second direction is in a <01$\bar{1}$> direction.

30. An optical circuit in accordance with claim 8, wherein the second optical device is a passive optical device.

31. An optical circuit in accordance with claim 8, wherein the first and second directions extend substantially parallel to first and second crystallographic axes, respectively, of the monocrystalline layer.

* * * * *